United States Patent
Takebayashi

(10) Patent No.: US 6,570,270 B2
(45) Date of Patent: May 27, 2003

(54) POWER CONDITIONER FOR SOLAR POWER GENERATION SYSTEM

(75) Inventor: Tsukasa Takebayashi, Yamatotakada (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/120,831

(22) Filed: Apr. 12, 2002

(65) Prior Publication Data
US 2002/0149950 A1 Oct. 17, 2002

(30) Foreign Application Priority Data
Apr. 13, 2001 (JP) ........................................ 2001-114966

(51) Int. Cl.$^7$ ................................................ H02J 1/00
(52) U.S. Cl. ........................................ 307/81; 368/205
(58) Field of Search .............................. 307/64, 66, 75, 307/48, 80, 86, 43; 320/101; 323/906; 136/244; 368/205; 713/340; 700/279, 298

(56) References Cited

U.S. PATENT DOCUMENTS

| 4,253,764 A | * | 3/1981 | Morrill ........................ 356/225 |
| 4,678,330 A | * | 7/1987 | Gutschick et al. .......... 356/222 |
| 5,555,927 A | * | 9/1996 | Shah ............................ 165/239 |

FOREIGN PATENT DOCUMENTS

JP 2000-304779 A 11/2000

* cited by examiner

Primary Examiner—Shawn Riley
(74) Attorney, Agent, or Firm—Nixon & Vanderhye P.C.

(57) ABSTRACT

An inverter unit converts power from a solar battery into AC power and interconnects the AC power with a utility power supply. A control circuit manages the time during which the inverter unit stops. If the time is equal to or longer than a predetermined time, it is determined that one day has passed. Data for one day stored in a memory is accordingly cleared and data is newly stored in the memory.

6 Claims, 14 Drawing Sheets

DATA FORMAT

REMOTE CONTROLLER → MAIN BODY

HEADER SECTION / DATA SECTION / PARITY BIT

MAIN BODY → REMOTE CONTROLLER

HEADER SECTION / DATA TYPE / DATA / PARITY BIT

DATA SECTION

HEADER SECTION (COMMON)

FIG.9D

DATA SECTION (REMOTE CONTROLLER→MAIN BODY)

| DETAILS | SWITCH | | | | | DETAILS | |
|---|---|---|---|---|---|---|---|
| | SELF-SUSTAINING / INTERCONNECT | START / STOP | ENVIRONMENTAL CONTRIBUTION MONITOR | DISPLAY CHANGE | PERIOD-POWER RESET | TIMER OPERATION | NIGHTTIME MANIPULATION |
| 1 | SW | SW | SW | SW | SW | OPERATE | MANIPULATED |
| 0 | | | | | | TERMINATE | NO MANIPULATION |

FIG.9E

DATA SECTION (MAIN BODY→REMOTE CONTROLLER)

| DATA TYPE | CODE | | | | DATA |
|---|---|---|---|---|---|
| DISPLAY POWER | 0 | 0 | 0 | 0 | NUMERICAL VALUE |
| DISPLAY ONE-DAY POWER AMOUNT | 0 | 0 | 0 | 1 | NUMERICAL VALUE |
| DISPLAY PERIOD-POWER AMOUNT | 0 | 0 | 1 | 0 | NUMERICAL VALUE |
| DISPLAY TOTAL POWER AMOUNT | 0 | 0 | 1 | 1 | NUMERICAL VALUE |
| DISPLAY REDUCED $CO_2$ AMOUNT | 0 | 1 | 0 | 0 | NUMERICAL VALUE |
| GRAPH | 1 | 0 | 0 | 0 | NUMERICAL VALUE |
| STORE ONE DAY | 1 | 0 | 1 | 0 | NUMERICAL VALUE |
| STORE PERIOD | 1 | 0 | 1 | 1 | NUMERICAL VALUE |
| STORE TOTAL | 1 | 1 | 0 | 0 | NUMERICAL VALUE |
| STORE REDUCED $CO_2$ AMOUNT | 1 | 1 | 0 | 1 | NUMERICAL VALUE |

1 HOUR

2 HOURS

3 HOURS

4 HOURS

12 HOURS

13 HOURS

MAIN BODY POWER
SUPPLY STOP
NIGHTTIME DISPLAY

RESTARTED
AFTER
TIMER STOPS

4 HOURS
RESTARTED IN
TIMER OPERATION

POWER CONDITIONER FOR SOLAR POWER GENERATION SYSTEM

BACKGROUND OF THE INVENTION

1. Field of the Invention

The present invention relates to a power conditioner for a solar power generation system. Specifically, the present invention relates to a power conditioner for a solar power generation system that converts direct-current or DC power generated by a solar battery into alternating-current or AC power which is in turn interconnected with a commercial or utility power supply.

2. Description of the Background Art

In general, a power conditioner for a solar power generation system includes an inverter unit as a main circuit, an inverter driver unit, a controller unit, a display unit, an operation unit, and a power supply circuit unit which provides required power to each of these units. The display unit provides respective indications of instantaneous output power and integral power of the power conditioner that are detected and calculated by the controller unit, or an indication of a period power amount which can arbitrarily be initialized by a user. If the display unit indicates an amount of power in a certain period of time, for example, in a day or month, the display unit should have clock and calendar functions to determine the hour and (period of) time by means of a timer included therein. If the power supply circuit converts power provided from a solar battery to supply the converted power to each circuit unit, another power supply circuit is included that provides power from a nighttime timer-backup power supply or utility power supply.

According to a conventional method disclosed in Japanese Patent Laying-Open No. 2000-304779, a timer is used to calculate an amount of power in a day and indicate the calculated amount without clock function being used. For a nighttime operation, a power supply circuit is used that supplies power from a nighttime backup power supply or utility power supply, in order to provide only stored indications according to any manipulation. Here, data is not updated for example.

The solar power generation system is employed for the purpose of predominantly utilizing power generated by means of a solar battery and thus reducing consumption of power from the utility power supply. If the generated power exceeds household power consumption, the surplus power may inversely be flown and sold to an electric power utility company. Thus, the amount of generated power serves as important information for users or customers.

The amount of power generated by a solar battery varies depending on the amount of solar radiation and thus a constant output power is impossible to produce. For this reason, it is difficult to estimate the amount of power based on time. It is thus advantageous functionally to enable users or customers to ascertain the amount of generated power as well as the transition of the amount of power.

According to the conventional method without clock function, in order to know a daily amount of generated power, it is necessary to read an indication of an integral power amount and subtract the power amount every day or to initialize a period power amount every day, which is troublesome.

According to the conventional method with clock function, it is possible to automatically calculate and display an amount of power generated in a day. However, accurate information cannot be given if the time is incorrect, therefore, the time must be set upon installation. In addition, if the utility power supply is used as an internal power supply and an electric power failure or outage occurs, the time must be set again after recovery from the power failure. If the timer uses a battery as a power source, troublesome battery replacement and time setting are required when the battery becomes exhausted.

In addition, according to the conventional method by which time is measured not by means of clock function but timer for calculating and displaying an amount of power, one day means a time period from the time preceding by 24 hours to the present time. Thus, the amount of power does not represent an amount of power generated in a period from the start of power generation of the instant day, but represents an amount of power generated in 24 hours. In other words, if an amount of power generated in one day is ascertained at noon, the amount of power represents the one generated in a period from the yesterday noon to the present time (noon). Then, it is impossible to know the amount of power generated in a period from the start of power generation of the instant day to the noon of that day.

Moreover, if the power supply circuit converts power from a solar battery and supplies the converted power to each circuit, the control circuit unit of the power conditioner does not operate in the nighttime during which no power is generated by the solar battery. Then, any manipulation of a remote controller in the nighttime is not accepted, or manipulation details in the nighttime are not reflected and accordingly become invalid.

SUMMARY OF THE INVENTION

One object of the present invention is thus to provide a power conditioner for a solar power generation system that can display information concerning power generation, for example, an amount of power solar-generated in a day, without clock function and without requiring hour- or time-setting.

Briefly, the present invention is a power conditioner for a solar power generation system that has an inverter converting power generated by a solar battery into AC power to interconnect the AC power with a utility power supply. The power conditioner includes a control circuit which has a memory storing data for one day. The control circuit manages a time during which the inverter stops, and determines that one day has passed when the time is equal to or longer than a predetermined time. Then, the control circuit clears the memory and stores new data in the memory.

According to the present invention, it is thus possible to ascertain daily information of the power conditioner, without internal clock function and without troublesome time-setting.

The power conditioner further includes a display unit for displaying an amount of power generated in a predetermined time when the inverter operates. The amount of power is represented by a certain number of graphs. The control circuit updates data displayed by the display unit as time passes, successively moves previous data on the graphs, and maintains the displayed data as it is without updating the displayed data during a time in which the inverter stops.

The power conditioner further includes a remote controller separated from the control circuit for remotely providing a control command to the control circuit.

The remote controller operates by receiving power from the utility power supply to manage the time during which the inverter stops.

The remote controller operates by receiving power from the solar battery when the inverter is running, and transmits, to the control circuit, details of manipulation of the remote controller when the inverter stops, the details of manipulation being transmitted when the inverter is started.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 9A–9E show formats of communicated data.

DESCRIPTION OF THE PREFERRED EMBODIMENTS

Figure 1:
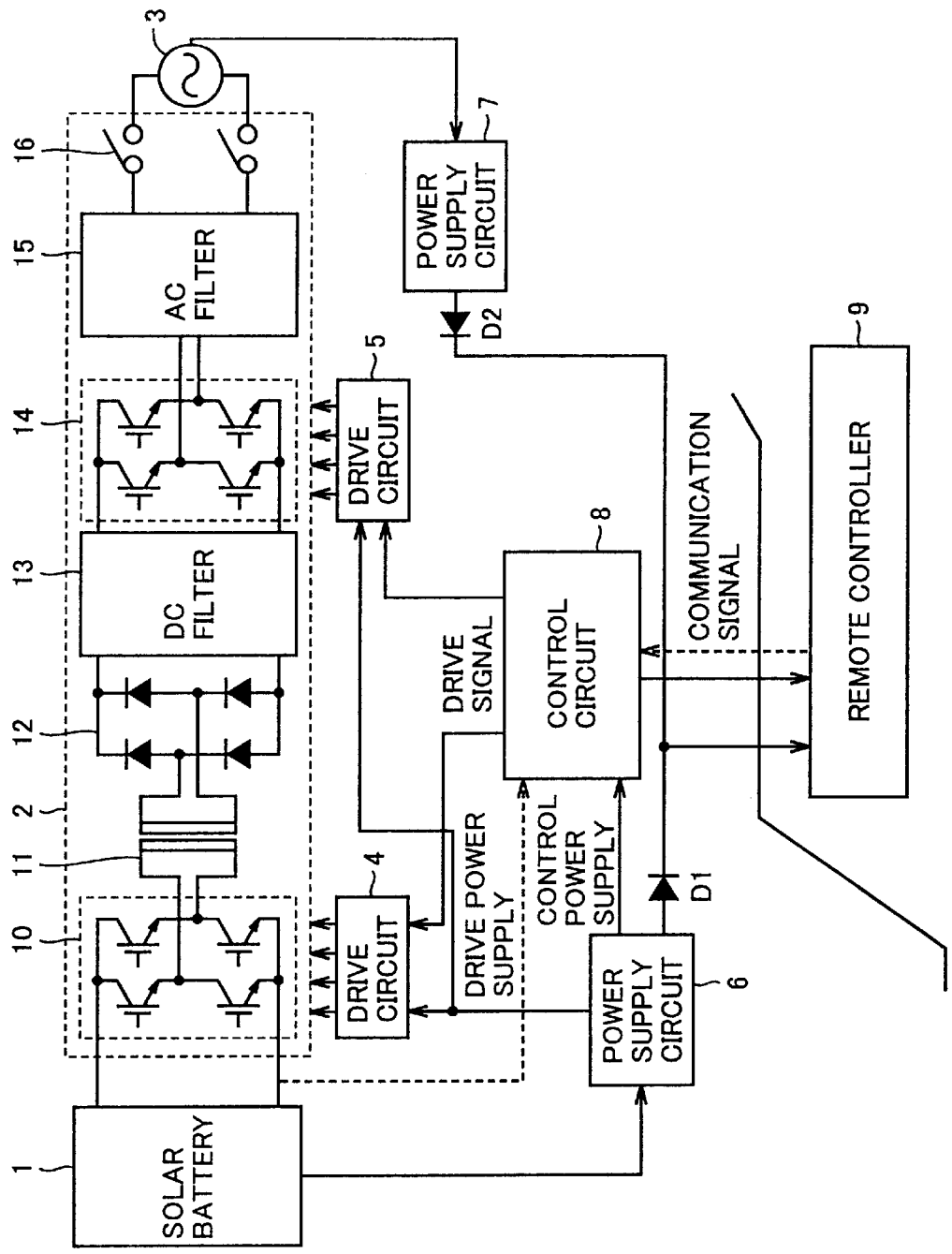
FIG. 1 is a block diagram showing a configuration of a power conditioner for a solar power generation system according to a first embodiment of the present invention.

Referring to FIG. 1, a power conditioner for a solar power generation system according to a first embodiment includes a solar battery 1, an inverter unit 2 converting DC power generated from solar battery 1 into AC power to interconnect the AC power with a utility power supply 3, drive circuits 4 and 5 for driving inverter unit 2, a power supply circuit 6 serving as a main power supply unit using the DC power from solar battery 1 for providing drive power to inverter unit 2, a power supply circuit 7 serving as an auxiliary power supply unit converting AC power from utility power supply 3 into DC power to be used, a control circuit 8 receiving control power from power supply circuit 6 for providing a drive signal to inverter unit 2, and a wired remote controller 9 providing and receiving communication signals to and from control circuit 8 to remotely control operation of inverter unit 2.

Control circuit 8 controls not only power of inverter unit 2 but also the whole of the power conditioner. Control circuit 8 calculates output power and further calculates an integral amount of power, a period-power amount, a power amount per day, and an amount of reduced $CO_2$, and accordingly stores the calculated values in a nonvolatile memory included therein. To remote controller 9, power supply circuit 6 continuously supplies power as control power supply via an anti-backflow diode D1. Only in a case where power is unavailable from power supply circuit 6 in nighttime for example, power supply circuit 7 provides control power supply to remote controller 9 via an anti-backflow diode D2.

A high-frequency insulation circuit is used for inverter unit 2 with its structure and operation described briefly below. A DC voltage from solar battery 1 is provided to a high-frequency inverter unit 10 included in inverter unit 2, and the DC voltage is converted by switching devices into a high-frequency AC voltage. The resultant high-frequency AC voltage is provided to and boosted by a transformer 11, full-wave rectified by a diode bridge 12, and accordingly provided to a DC filter circuit 13.

DC filter circuit 13 is constituted of a reactor for eliminating a high-frequency component and a capacitor. The DC voltage with its high-frequency component removed by DC filter circuit 13 is provided to a low-frequency inverter unit 14 constituted of switching devices that convert the DC voltage into an AC voltage synchronized with the cycle of utility power supply 3. The AC voltage generated by low-frequency inverter unit 14 is provided to an AC filter circuit 15 where a high-frequency component of the AC voltage is removed. The resultant AC voltage with its high-frequency component eliminated therefrom is supplied via an interconnection relay 16 to utility power supply 3.

In inverter unit 2 having the above-described structure, the DC voltage from solar battery 1 is converted into the high-frequency AC voltage by high-frequency inverter unit 10 performing a switching function according to a PWM control signal generated by control circuit 8. Then, the high-frequency AC voltage is isolated and boosted by transformer 11. The high-frequency AC voltage boosted by transformer 11 is full-wave rectified by diode bridge 12 and accordingly converted into the DC voltage. A high-frequency component of the DC voltage is thereafter removed by DC filter circuit 13. The DC voltage has its waveform which is full-wave rectified with respect to the waveform of utility power supply 3. Further, the DC voltage is converted into the AC voltage by low-frequency inverter unit 14 performing a switching function according to an aliasing control signal synchronized with the cycle of utility power supply 3 that is generated by control circuit 8. The AC voltage is thus output through AC filter circuit 15 and interconnection relay 16 to be interconnected with utility power supply 3.

Power supply circuit 6 supplies the power from solar battery 1 to inverter unit 2, control circuit 8 and remote controller 9. On the other hand, power supply circuit 7 supplies the power from utility power supply 3 to remote controller 9 when power is unavailable from power supply circuit 6. Switching regulator system for example is used for power supply circuits 6 and 7.

Figure 2:
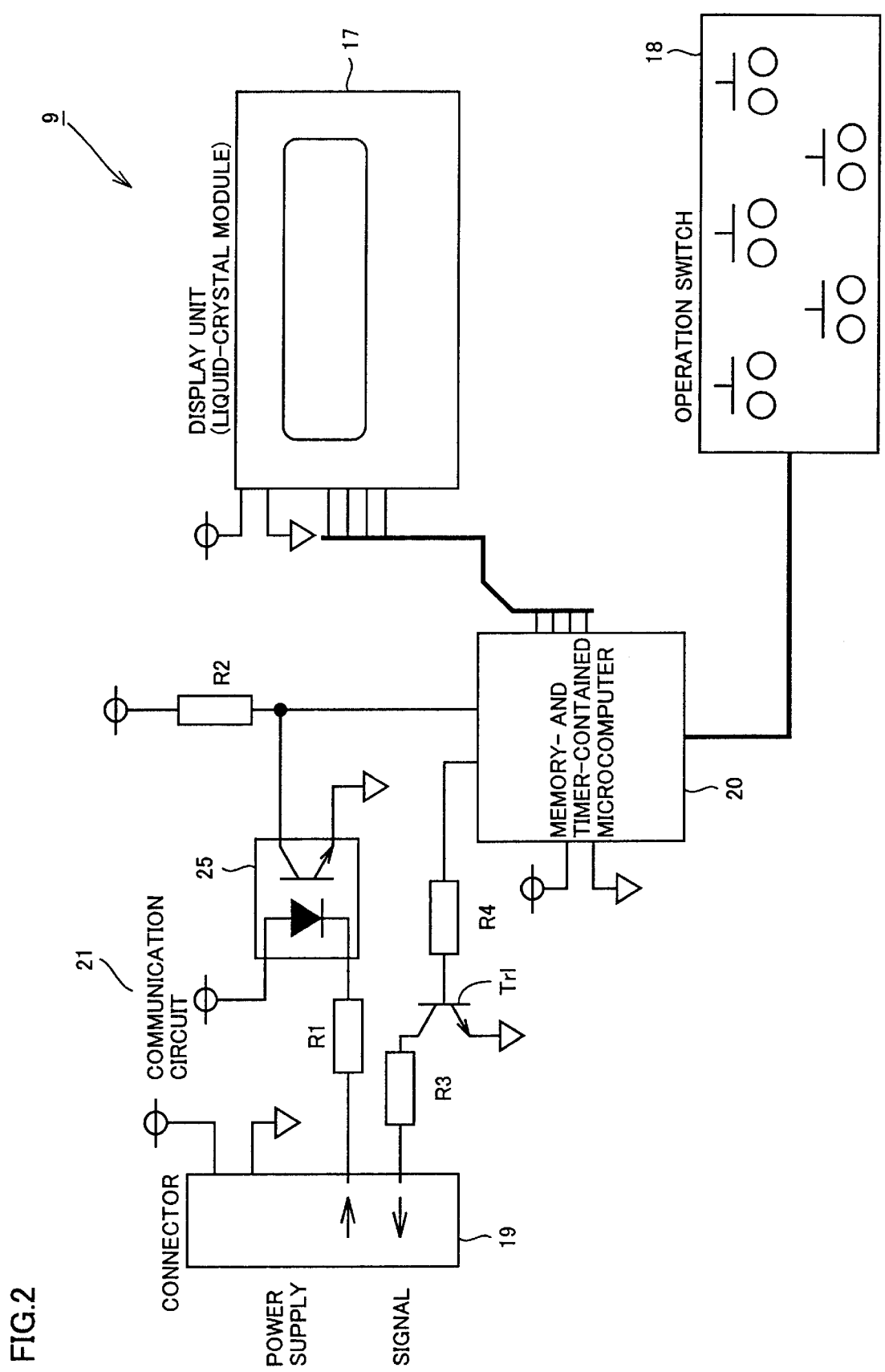
FIG. 2 is a block diagram showing a configuration of a remote controller shown in FIG. 1.
Figure 3:
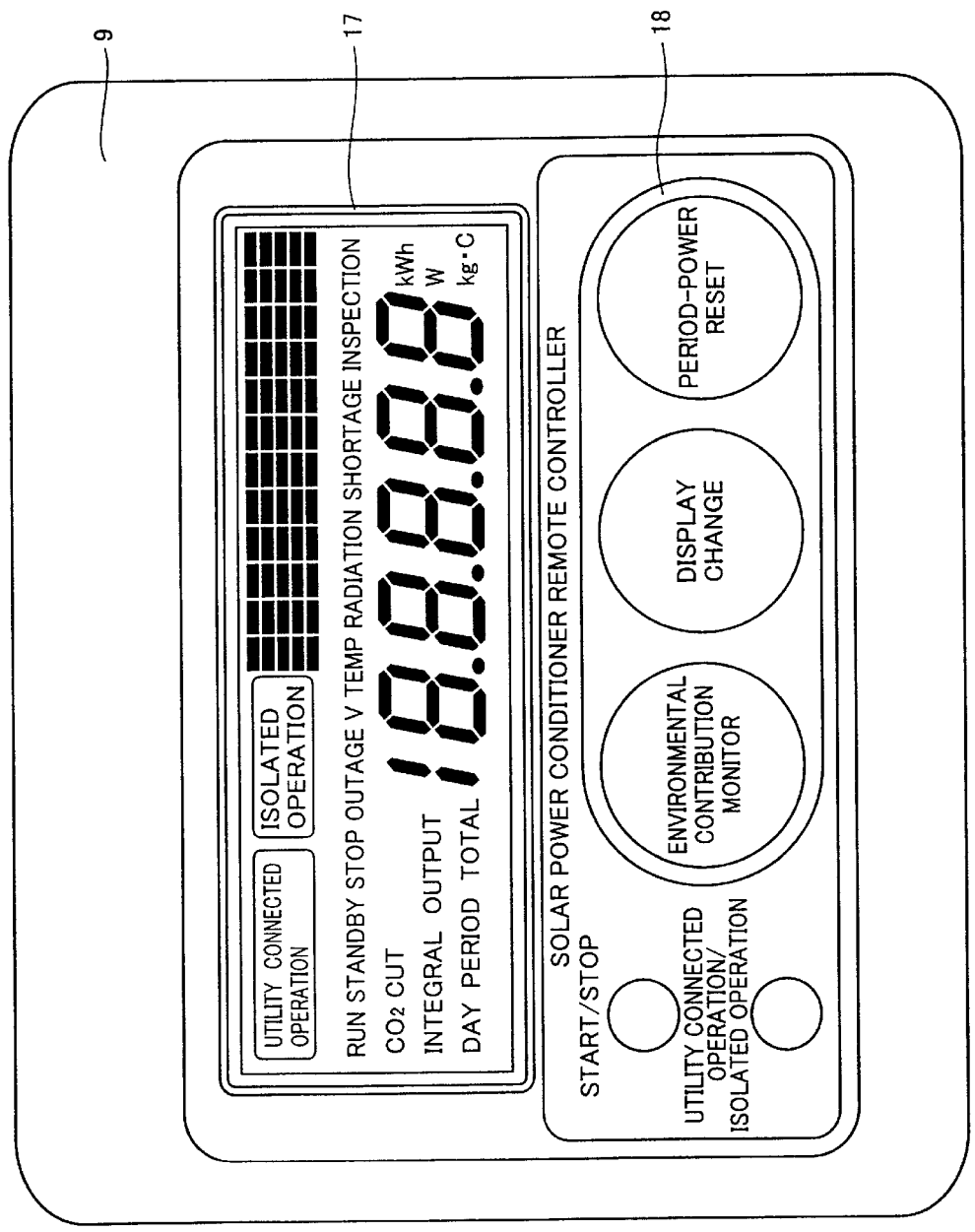
FIGS. 3A and 3B show external views of the remote controller.

FIG. 2 is a block diagram showing a configuration of the remote controller shown in FIG. 1. FIGS. 3A and 3B show respective external views of the remote controller.

Referring to FIG. 2, remote controller 9 includes a control microcomputer 20 containing therein an internal memory as a memory unit and a timer, and further includes a display unit 17 as a liquid-crystal module controlled by control microcomputer 20. Moreover, remote controller 9 includes a connector 19 for connection with the main body of the power conditioner. Control power supply and a communication signal are accordingly provided through connector 19 from the main body to remote controller 9. Connector 19 has a terminal for receiving the communication signal that is coupled via a resistor R1 to one input terminal of a light-emitting element of a photocoupler 25. The other input terminal of the light-emitting element receives the control power supply. An output terminal of a light-receiving element of photocoupler 25 receives the control power supply via a resistor R2, and the output terminal of photocoupler 25 is coupled to an input terminal of control microcomputer 20.

Control microcomputer 20 has an output terminal coupled via a resistor R4 to the base of a transistor Tr1 and the collector of transistor Tr1 is coupled via a resistor R3 to a terminal for transmitting the communication signal of connector 19. Resistors R1–R4, photocoupler 25 and transistor Tr1 accordingly constitute a communication circuit. The control circuit of the main body of the power conditioner has a similar communication circuit by which two-way communication is possible between the main body and remote controller 9.

An operation switch 18 is connected to control microcomputer 20. As shown in FIG. 3A, operation switch 18 includes a "start/stop" switch, an "utility connected operation/self-sustaining" switch for changing the operation mode, an "environmental contribution monitor" switch, a "display change" switch, and a "period-power reset" switch.

Display 17 which is the liquid-crystal module provides indications including respective indications of the operational status (running, stop, standby, outage, radiation shortage, inspection), the operation mode (utility connected operation, self-sustaining), a graph showing a transition of a power amount hour by hour in a day, output power in operation, an integral power amount after installation, a period power amount representing an amount of power generated in a certain period, a power amount of one day, a converted value of an amount of reduced $CO_2$, and an error code used for occurrence of abnormal stop.

These indications are presented on display 17 in operation of the power conditioner for the solar power generation system that is structured as described above. The indications are produced through calculation by control circuit 8 of the main body. Each time control circuit 8 outputs such information, remote controller 9 accordingly receives the information which is in turn displayed on display unit 17. In addition, each time remote controller 9 is manipulated, the manipulation details are transmitted to control circuit 8 of the main body. Such operations of remote controller 9 are controlled by the microcomputer contained therein. The data is communicated as serial data between control circuit 8 of the main body and remote controller 9 through two lines.

Figure 4:
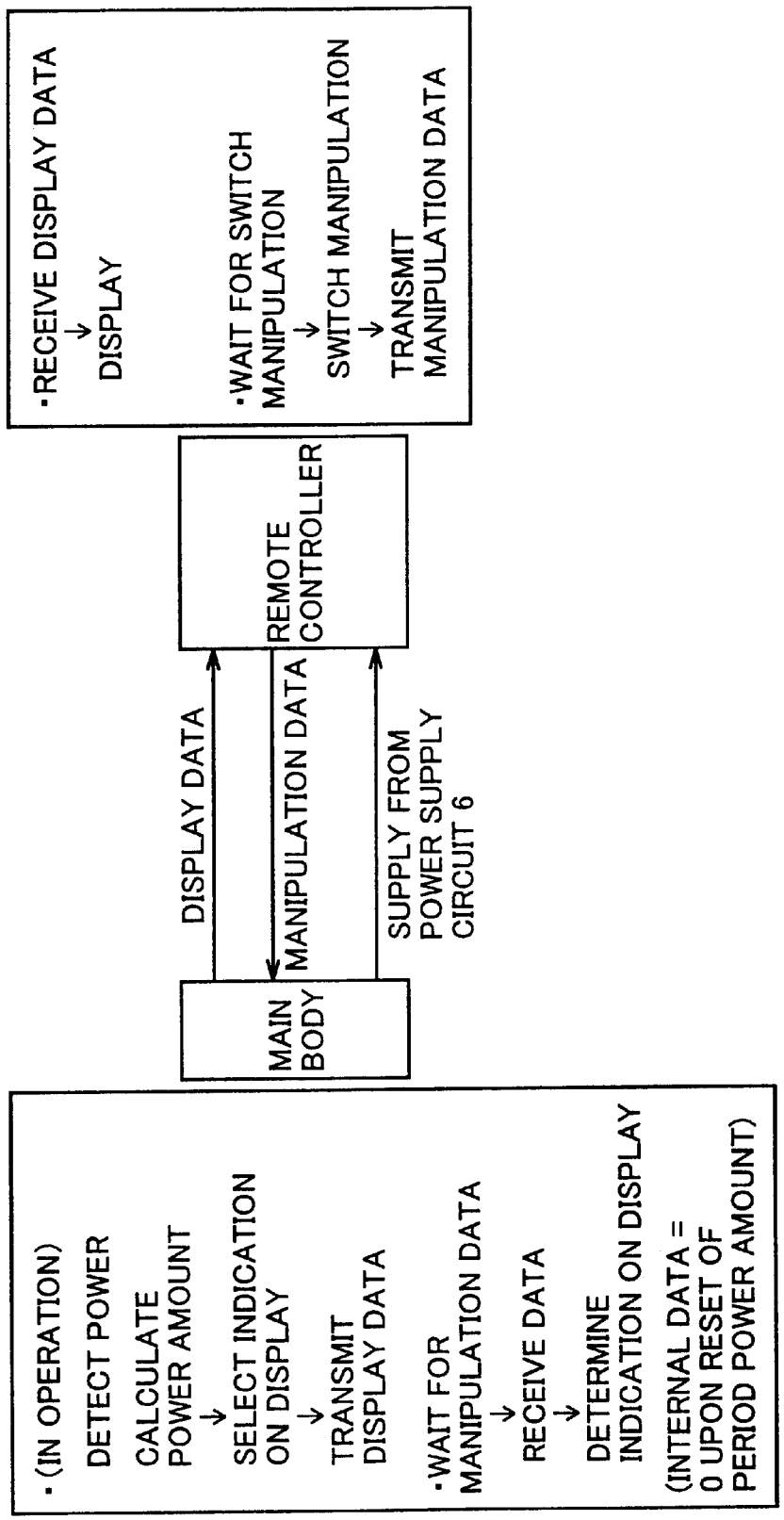
FIG. 4 illustrates an operation when a solar battery generates power.
Figure 5:
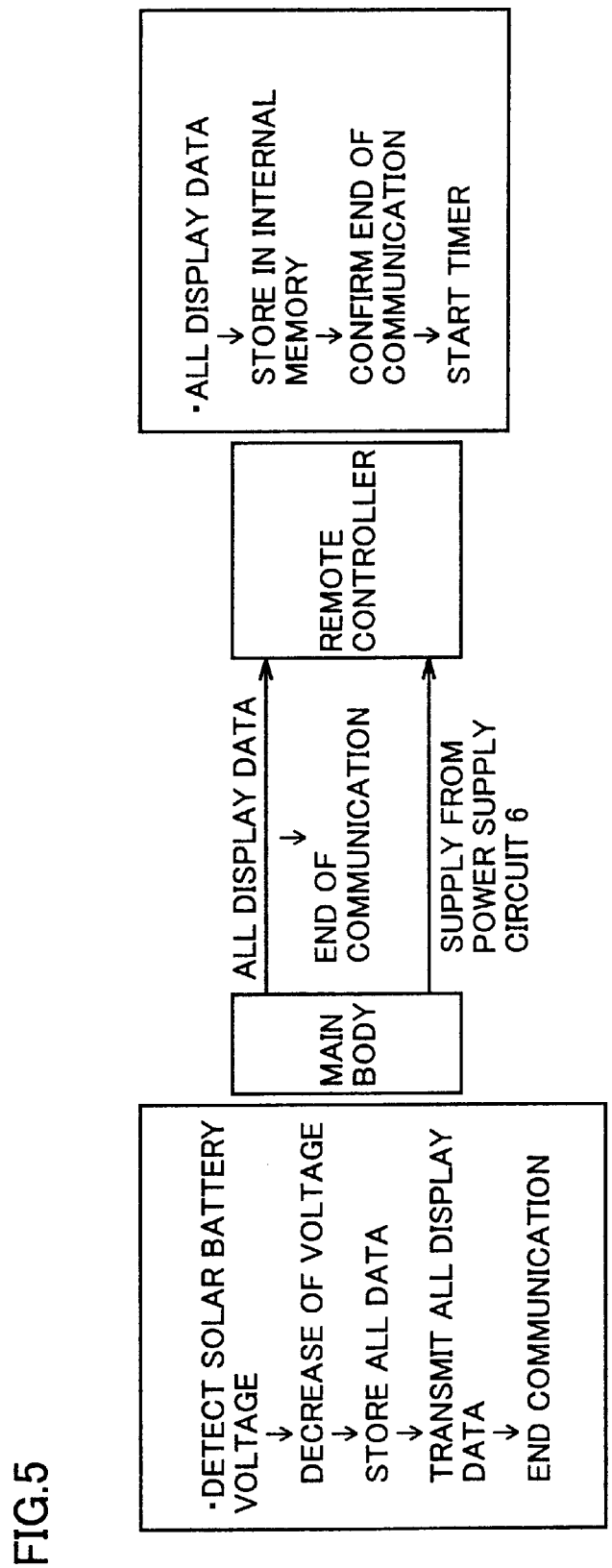
FIG. 5 illustrates an operation when the output from the solar battery decreases.
Figure 6:
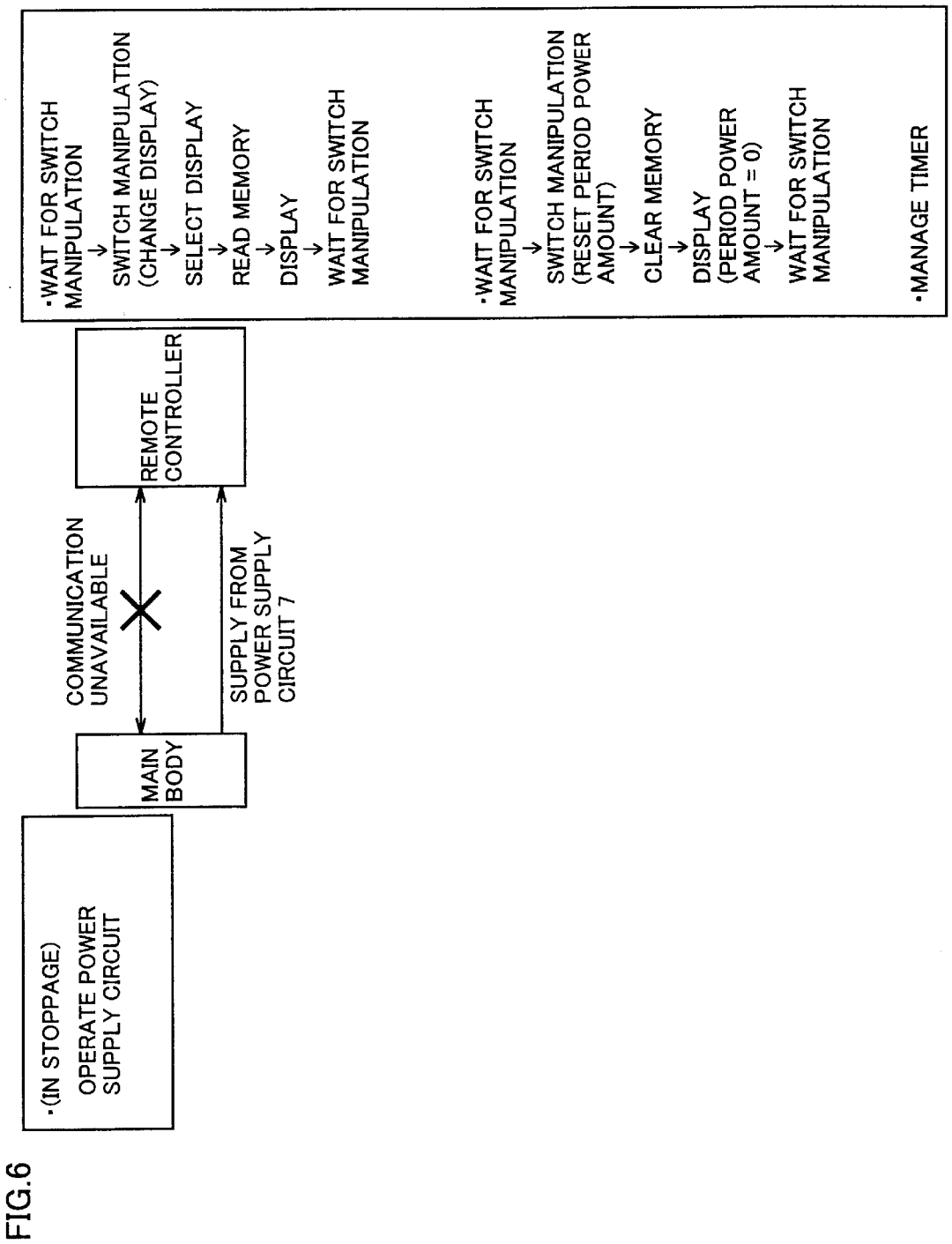
FIG. 6 illustrates an operation when no power is generated by the solar battery (in nighttime).
Figure 7:
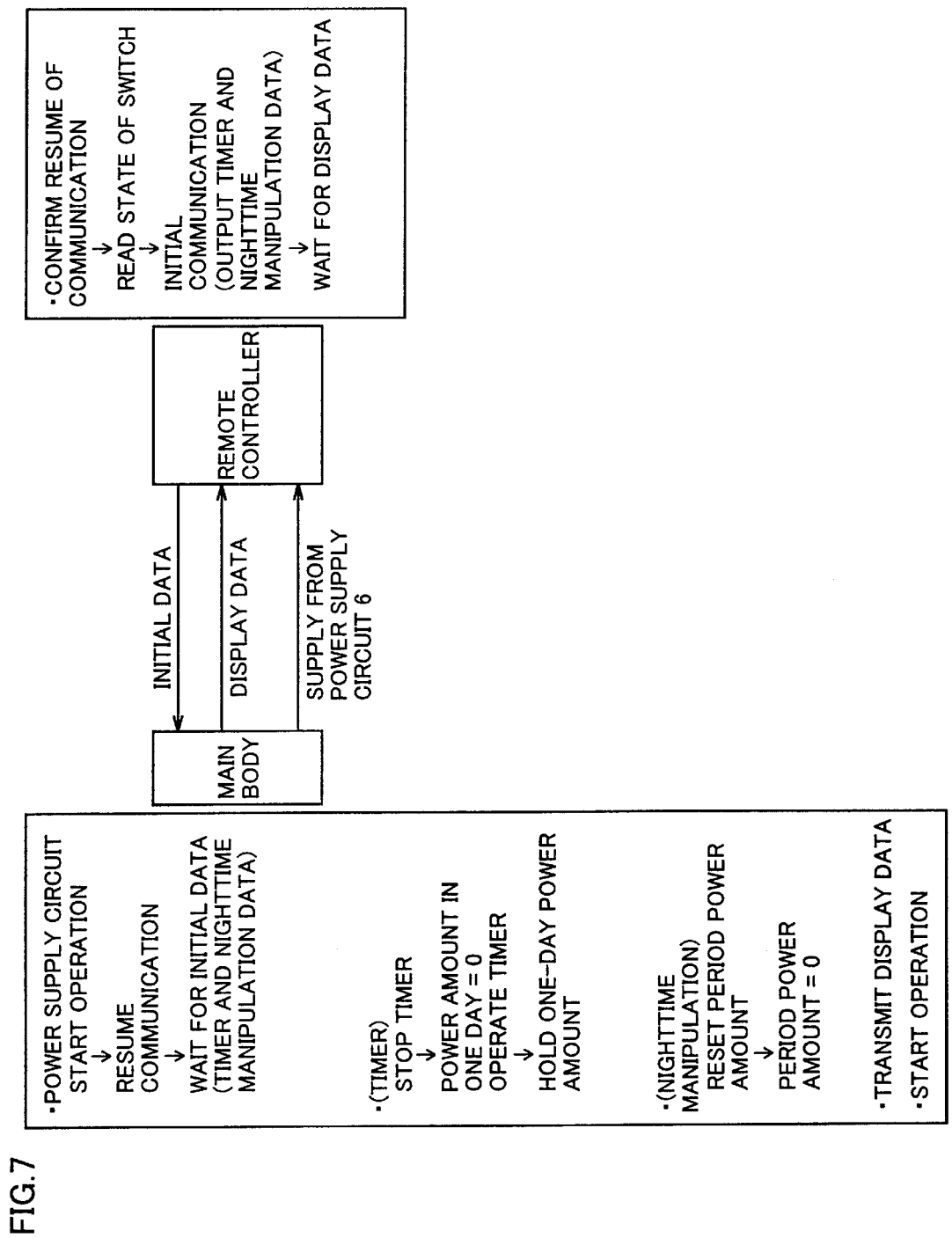
FIG. 7 illustrates an operation when the solar battery starts generating power.
Figure 8:
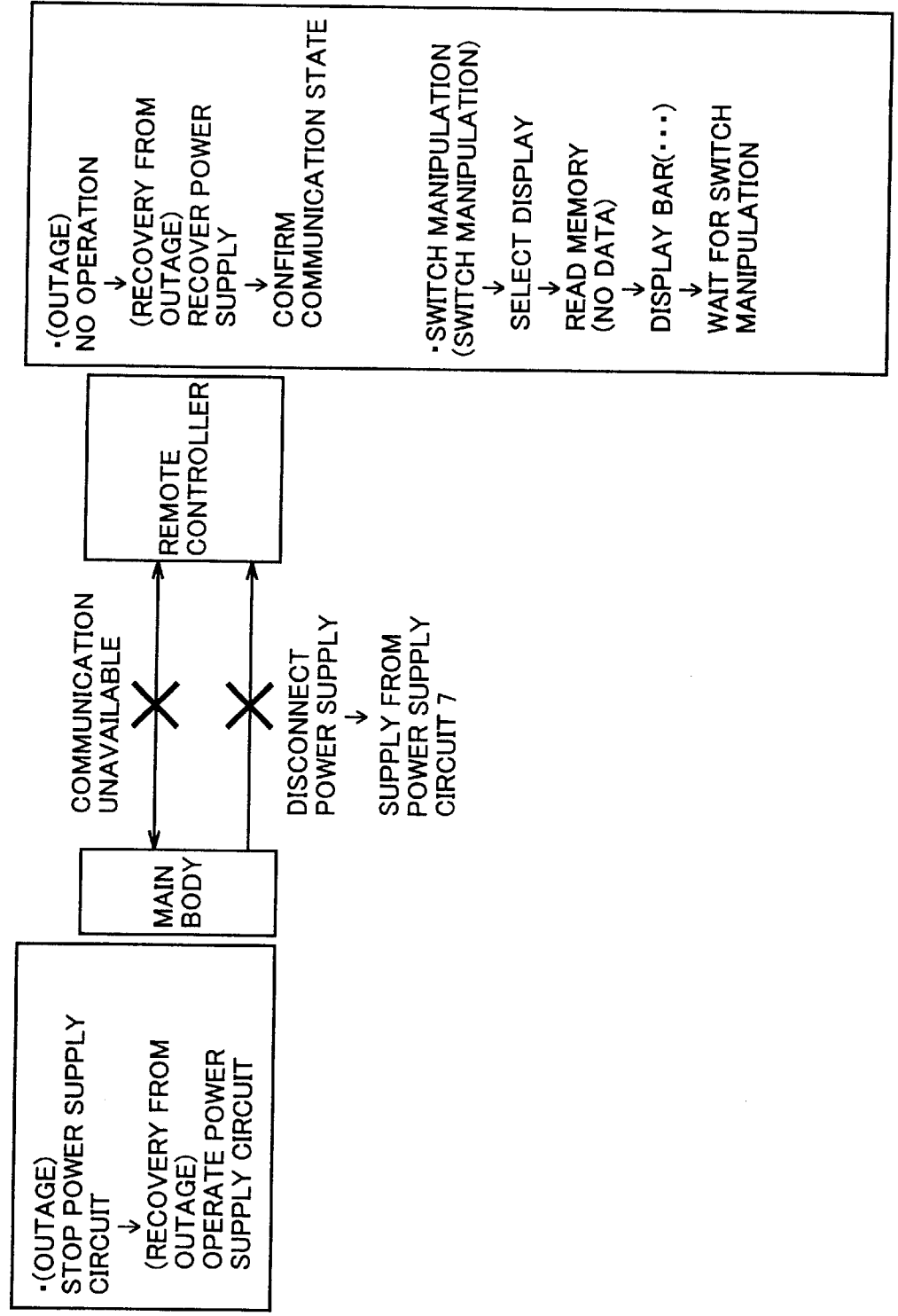
FIG. 8 illustrates an operation in nighttime upon outage and recovery from the outage.

According to the first embodiment of the present invention, FIG. 4 illustrates an operation when power is generated by the solar battery, FIG. 5 illustrates an operation when the output of the solar battery decreases, FIG. 6 illustrates an operation (in nighttime) when no power is generated by the solar battery, FIG. 7 illustrates an operation when the solar battery starts generating power, and FIG. 8 illustrates an operation in nighttime upon outage and recovery from the outage. FIGS. 9A–9E show communication data formats and FIGS. 10A–10I show graphs showing a transition of the amount of power.

With reference to FIGS. 1–10I, an operation according to the first embodiment of the present invention is described in detail.

In operation, as shown in FIG. 4, the main body of the power conditioner detects output power and accordingly calculates the amount of the output power. The data regarding the detected output power is transmitted all the time to remote controller 9 which then receives and displays the data on display unit 17. Remote controller 9 is on standby until operation switch 18 is manipulated. When operation switch 18 is manipulated, information concerning the manipulation is transmitted to the main body. The main body selects any indications to be presented on display unit 17 of remote controller 9. Thus, the data concerning the amount of power is transmitted to remote controller 9 which accordingly receives the data and changes any indication on the display. When the period-power reset switch is manipulated, operation switch 18 informs this manipulation of the main body which in turn resets the period-power amount to 0 and transmits 0 as display data. Then, remote controller 9 receives the data to present the period-power amount as 0.

When the amount of solar radiation decreases which accordingly reduces the output from solar battery 1, control circuit 8 detects that reduction of the output voltage. When the output voltage from solar battery 1 decreases to a first predetermined voltage or less, control circuit 8 outputs to inverter unit 2 a signal for making the switching devices off and accordingly stopping operation of inverter unit 2.

At this time, as shown in FIG. 5, control circuit 8 transmits, to remote controller 9, data regarding the integral power amount, period power amount, power amount for one day, converted value of an amount of reduced $CO_2$, and error code, for example, for storing the data in remote controller 9. Control circuit 8 also stores the data in the internal nonvolatile memory therein. At this time, remote controller 9 stores the data in its internal memory. After this, control circuit 8 stops communication with remote controller 9, and remote controller 9 is triggered by the termination of the communication with control circuit 8 and accordingly starts a timer.

Power supply circuit 6 has a second predetermined voltage lower than the first predetermined voltage. When the amount of solar radiation further decreases which further reduces the output from solar battery 1 to the second predetermined voltage or less, power supply circuit 6 stops providing the drive power supply and the control power supply. Accordingly, no power is supplied from power supply circuit 6 to inverter drive circuits 4 and 5, control circuit 8 and remote controller 9 and thus control circuit 8 stops operating. However, power supply circuit 7 provides power to remote controller 9 which is thus operated by the power from power supply circuit 7.

As shown in FIG. 6, when the power is supplied from power supply circuit 7 to remote controller 9, data in a memory is read and displayed only in a case where operation switch 18 is manipulated. Power supply circuit 6 additionally has a third predetermined voltage higher than the first predetermined voltage. When the amount of solar radiation recovers the next morning for example, so that the output voltage from solar battery 1 increases to the third predetermined voltage or more, power supply circuit 6 starts operation as shown in FIG. 7 to resume supply of power to inverter unit 2, control circuit 8 and remote controller 9 that accordingly start operation.

Figure 9A:
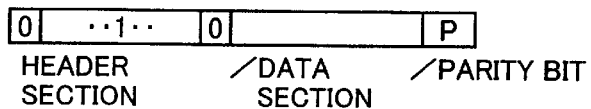
Figure 9B:
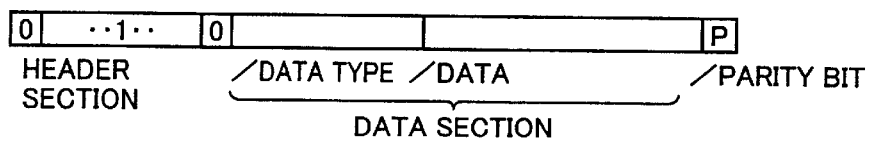
Figure 9C:
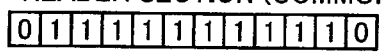

Communicated data is now described. Communicated data is serial data as described above. A data format shown in FIG. 9A is transmitted from remote controller 9 to the main body, and a data format shown in FIG. 9B is transmitted from the main body to remote controller 9. The data formats each have a header section, a data section and a parity bit. FIG. 9C shows the header section, FIG. 9D shows data communicated from remote controller 9 to the main body, and FIG. 9E shows data communicated from the main body to remote controller 9. Delimiter signals (e.g. <"1", "0">) are inserted into the communicated data at certain intervals (e.g. 8 bits) for determining if the data is abnormal or not for example.

As discussed above, the data transmitted from the main body to remote controller 9 show details of display. The data include different types of data, for example, data indicating power and data indicating an integral power amount. Thus, the data section transmitted from the main body to remote controller 9 is formed of data types and data to be displayed. Data type codes are used for specifying the type of following data.

The data transmitted from remote controller 9 to the main body show details of manipulation, including, in addition to details of manipulation of the switch in operation (power is supplied from power supply circuit 6), operational status in nighttime (power is supplied from power supply circuit 7).

An operation is described of the communication circuits communicating data according to the data formats described above. The transistor of the transmitting communication circuit is turned on by signal "1" shown in FIG. 9C. At this time, the photocoupler of the receiving communication circuit has an ON output, and the signal in this receiving communication circuit has L level. Signal "0" provides inverse results. Thus, when data is not communicated, signal "0" shown in FIG. 9C is transmitted and the signal in the receiving communication circuit has H level. Thus, by signal "1" in the header section (L level signal in the receiving communication circuit), start of data communication is confirmed.

Remote controller 9 determines that control circuit 8 terminates communication and that control circuit 8 resumes communication as detailed below. When control circuit 8 terminates communication, the transmitting transistor of the communication circuit of control circuit 8 in the main body is maintained in OFF state (data "0"). At this time, the receiving-side remote controller 9 keeps receiving the H level signal. As mentioned above, delimiter signals are inserted into data at certain intervals, which means that, if communication is normal, remote controller 9 never keeps receiving H level signal. Therefore, remote controller 9 finds out that communication is ended. Remote controller 9 thus determines that communication is terminated, and maintains the transmitting transistor of remote controller 9 in OFF state (data "0"). This state is the same as that when power supply circuit 6 is stopped or a communication cable is broken.

When operation is resumed, the transmitting transistor of the communication circuit of the control circuit 8 in the main body is maintained in ON state (data "1") for a certain time, and accordingly remote controller 9 determines that the communication is resumed.

When a communication cable is broken, specifically, when a cable for transmitting a signal from control circuit 8 to remote controller 9 is broken, remote controller 9 determines, even if inverter 2 is in operation, that control circuit 8 stops inverter 2 from running and accordingly determines that communication is terminated as discussed above.

On the other hand, control circuit 8 allows inverter 2 to keep running since control circuit 8 intends to transmit display data. Here, as described above, remote controller 9 determines that control circuit 8 terminates communication and accordingly enters a similar communication-terminated state. Then, control circuit 8 regards the cable as being broken to stop inverter 2 from running. On the contrary, if a cable for transmitting a signal from remote controller 9 to control circuit 8 is broken, control circuit 8 determines that the cable is broken and directly stops inverter 2 from running. In this way, it is possible to completely stop inverter 2 from running when any cable breakage occurs.

Remote controller 9 has the timer as described below. The timer of remote controller 9 manages the time during which inverter 2 stops (main-body halt time=nighttime). As described in connection with FIG. 5, the timer is started when being triggered by termination of communication with control circuit 8.

Then, as shown in FIG. 7, when communication with control circuit 8 in the main body is resumed, information regarding whether or not the timer is running or stops at this time is transmitted to control circuit 8 in the main body.

"Timer time" represents nighttime. Then, if the timer time is 6 hours, the timer stops after 6 hours. If the operation is resumed and accordingly communication with the main body is resumed after 6 or more hours, it means that one day has passed. When communication is resumed and control circuit 8 receives data indicating that the timer stops, an amount of power for one day that is stored in the internal memory of control circuit 8 is cleared. At this time, if control circuit 8 receives data indicating that the timer is still operating, it means that one day has not passed so that the power amount for one day is not cleared but continually calculated.

As discussed above, the timer manages or controls the period from the time when the output voltage of solar battery 1 becomes equal to or lower than the first predetermined voltage and accordingly communication is terminated to the time when the output voltage becomes equal to or higher than the third predetermined voltage and accordingly communication is resumed. There is a possibility that, immediately after the output voltage of solar battery 1 becomes equal to or less than the first predetermined voltage, the amount of solar radiation increases so that characteristics of solar battery 1 allow the output voltage of battery 1 to become equal to or higher than the third predetermined voltage, which causes start of operation. For this reason, the timer manages the period as described above.

In particular, at or around sunset, solar battery 1 provides a considerably small output voltage. When the output voltage of solar battery 1 becomes equal to or lower than the second predetermined voltage and accordingly power supply circuit 6 stops, solar battery 1 has an open-circuit voltage. If the open-circuit voltage is equal to or higher than the third predetermined voltage, the operation is re-started. However, no output voltage from solar battery 1 can be obtained even if the operation is restarted, which results in stoppage. This process is repeated. If one-day data is cleared each time this process occurs, in most cases, data corresponding to one day has been cleared when the operation is terminated. As a result, no data concerning a power amount for the current day is left. Data cannot be ascertained in nighttime.) In order to avoid this, the timer is used for managing the time.

Transition of an amount of power is indicated by graphs as described below.

As shown in FIGS. 10A–10I, an integral power amount per hour is displayed by an indicator and thus an indication for a certain period of time is provided. As time passes, the indicator moves from the right to the left. Accordingly, when operation continues for a certain time or longer, the latest integral power amount at present can be displayed. According to this embodiment, the power amount is represented in five stages for 12 hours as shown in FIGS. 10A–10E.

In operation, control circuit 8 in the main body calculates an amount of power for one hour, and this data is hourly transmitted as graph data (0–5) to remote controller 9. Remote controller 9 receives the data and stores the latest data in the internal memory, and that latest data is displayed at the rightmost end on display unit 17. Remote controller 9 can store data for 12 hours, the internal memory updates data each time the memory receives data, and the displayed graph is updated for each reception from the main body.

Figure 10A:
FIGS. 10A–10I show exemplary graph indications representing a transition of an amount of power.
Figure 10B:
Figure 10C:
Figure 10D:
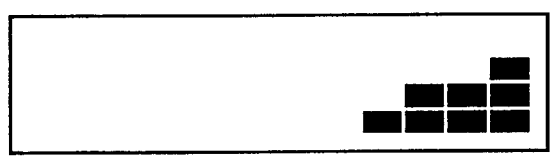
Figure 10E:
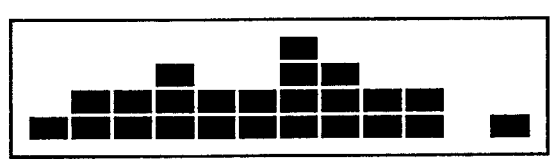
Figure 10F:
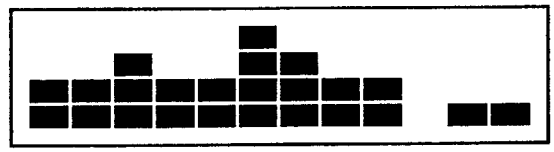
Figure 10G:
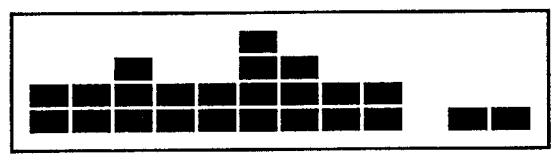
Figure 10H:
Figure 10I:
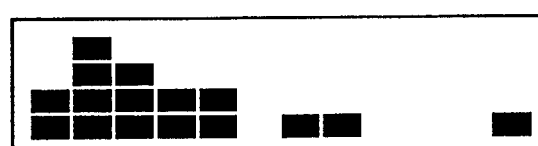

After inverter 2 stops, the data in the internal memory is held until remote controller 9 receives the next data. Displayed indications are made unchanged. As described above, whether or not one day has passed is determined according to the state of the timer after the operation is stopped. As shown in FIG. 10H, if the main body is started after the timer stops so that remote controller 9 receives the next graph data, the former displayed indications are cleared for newly presenting indications. If the main body is started before timer is terminated and accordingly remote controller 9 receives graph data, the indicators corresponding to the timer period are made 0 (no indication), and newly received data follows indicators 0.

Manipulation of remote controller 9 in nighttime is described below. As shown in FIG. 6, when any switch regarding display such as the "environmental contribution monitor" switch and "display change" switch is manipulated, data stored in the internal memory as described above is displayed.

When any switch except for the switches regarding display is manipulated, for example, the "period-power reset" switch is manipulated, stored internal data is made 0 and the fact that the switch is manipulated is stored. When the main body is started in the next morning and the initial communication is started, a period-power reset signal is transmitted to the main body. When control circuit 8 resumes communication, details of manipulation in nighttime are transmitted to control circuit 8 and data in the main body is cleared. This process is similar to that when the "operation mode change" switch is manipulated.

When outage occurs in nighttime and power supply circuit 7 stops as shown in FIG. 8, remote controller 9 also stops because power supply circuit 7 is stopped. Upon recovery from the outage, remote controller 9 can operate again. However, data transmitted from the main body and stored in the internal memory is erased. In addition, even if the period-power is reset, this reset is rendered invalid. If the internal memory has no data to be displayed in nighttime, "bar" is indicated. In this case, the timer is not started upon recovery from the outage. When the main body is started in the next morning, data showing that timer is stopped is transmitted as the initial communication, and accordingly, it is determined that one day has passed.

Figure 11:
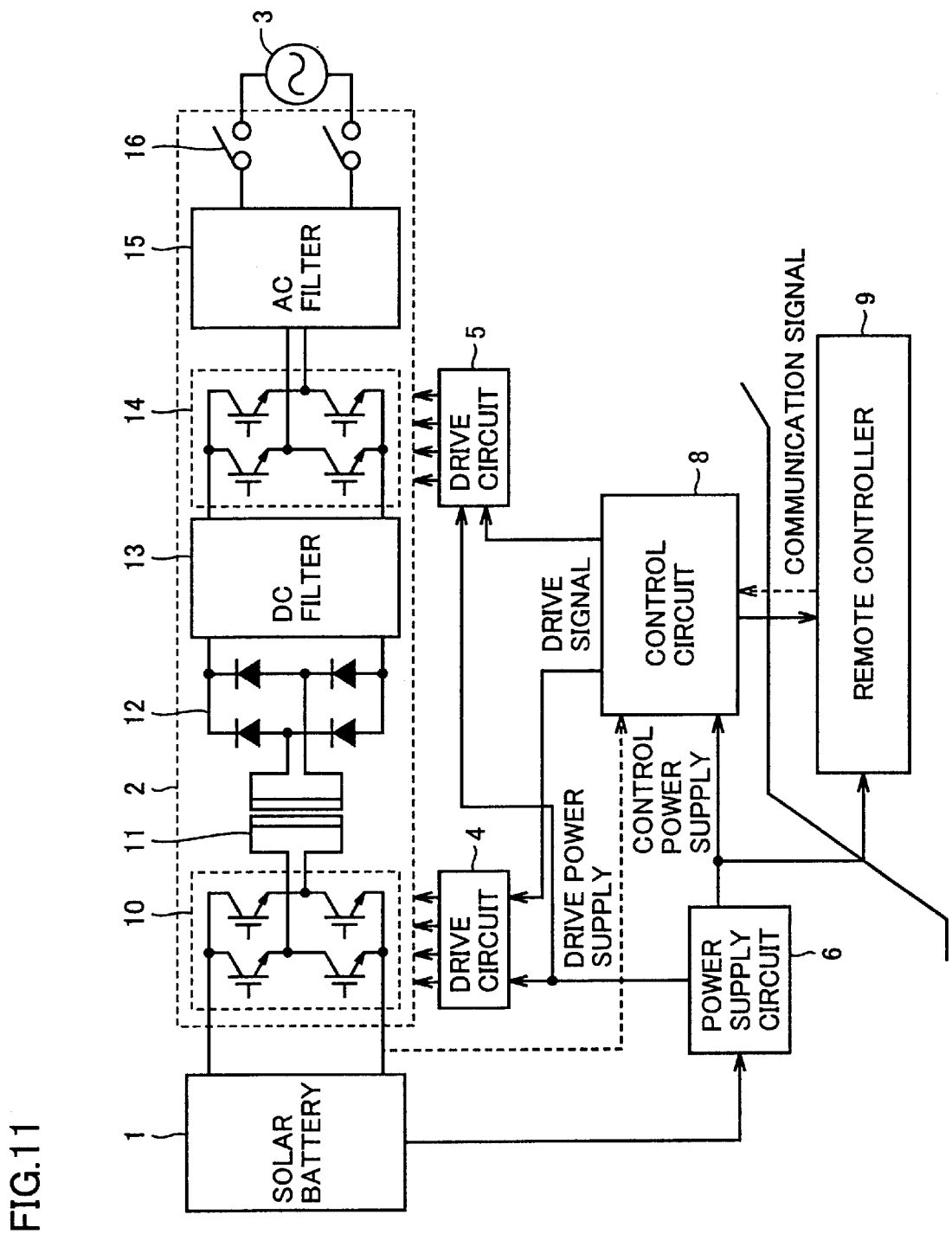
FIG. 11 is a block diagram showing a configuration of a power conditioner for a solar power generation system according to a second embodiment of the present invention.

FIG. 11 is a block diagram showing a power conditioner for a solar power generation system according to a second embodiment of the present invention. The power conditioner for the solar power generation system of the second embodiment shown in FIG. 11 differs from that in FIG. 1 in that the former includes no power supply circuit 7 that supplies DC power to remote controller 9 according to power from utility power supply 3 shown in FIG. 1. Structural details except for this are the same as those shown in FIG. 1.

Figure 12:
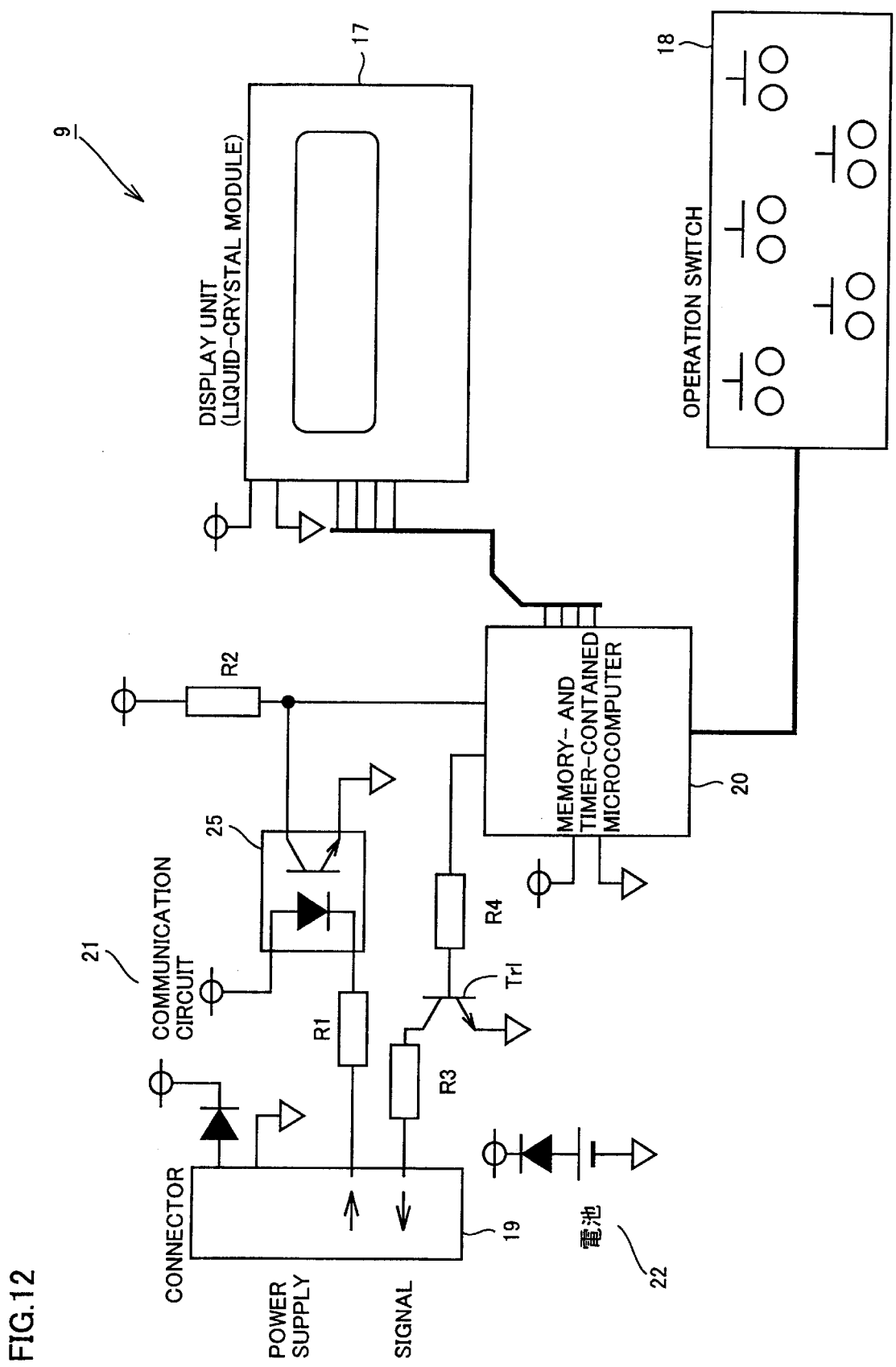
FIG. 12 is a block diagram showing a configuration of a remote controller shown in FIG. 11.

FIG. 12 is a block diagram showing another remote controller. The remote controller shown in FIG. 12 includes, as an auxiliary power supply 22, a battery and a diode. The positive electrode of the battery is connected to the anode of the diode, and the cathode of the diode is connected to the cathode of another diode connected to a power supply terminal of a connector. Thus, the control power supply is provided to remote controller 9. When inverter 2 stops, remote controller 9 receives the power supply from the internal auxiliary power supply unit 22 to operate. Details of the operation are the same as those of the remote controller shown in FIG. 2.

In this way, the timer manages the operation-stop time and accordingly data for one data can easily be managed without clock function. Moreover, it is possible to calculate and display an amount of power generated from the start of power-generation in a day.

As heretofore discussed, according to the embodiments of the present invention, the power conditioner for the solar power generation system includes the inverter converting power from the solar battery into AC power which is then interconnected with the utility power supply. The time during which the inverter stops is managed and, if the time is equal to or longer than a predetermined time, it is determined that one day has passed. Then, data for one day is cleared and new data is stored. Accordingly, without internal clock function and without troublesome time-setting, daily information of the power conditioner can be ascertained.

The display unit is provided that displays an amount of power generated in a predetermined time when the inverter operates, the amount of power being represented by a certain number of graphs. As time passes, the latest display data is updated and previous data is moved successively. When inverter is stopped, data is not updated and the displayed data is maintained as it is. It is accordingly possible to ascertain transition of the amount of power from the start of power generation to the end of power generation in one day.

The timer for managing time is operated by a power supply other than the solar battery. Thus, the timer can manage nighttime. Daily information of the power conditioner for the solar power generation system can accordingly be ascertained. In addition, troublesome re-setting of time is unnecessary when outage occurs or the battery is replaced.

Moreover, the remote controller is provided that receives power from the solar battery to operate when the inverter is running. The remote controller transmits data concerning details of controller manipulation during the period in which the inverter stops, the data being transmitted when the inverter is started again. Manipulation and display of the remote controller can thus be ascertained remotely from the power conditioner for the solar power generation system. Manipulation of the remote controller when the solar battery does not generate power can be reflected on the operation when the solar battery resumes power generation and inverter is running.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A power conditioner for a solar power generation system, said power conditioner being driven according to power generated by a solar battery, comprising:

an inverter converting the power generated by said solar battery into alternating-current power to interconnect the alternating-current power with a utility power supply; and a control circuit including a memory storing data for one day, said control circuit managing a time during which said inverter stops, and determining that one day has passed when said time is equal to or longer than a predetermined time, clearing said memory and storing new data in said memory.

2. The power conditioner for a solar power generation system according to claim 1, further comprising a remote controller separated from said control circuit for remotely providing a control command to said control circuit.

3. The power conditioner for a solar power generation system according to claim 1, further comprising a display unit for displaying an amount of power generated in a predetermined time when said inverter operates, said amount of power being represented by a predetermined number of graphs, wherein said control circuit updates data displayed by said display unit as time passes, successively moves previous data on said graphs, and maintains the displayed data as it is without updating the displayed data during the time in which said inverter stops.

4. The power conditioner for a solar power generation system according to claim 3, further comprising a remote controller separated from said control circuit for remotely providing a control command to said control circuit.

5. The power conditioner for a solar power generation system according to claim 4, wherein said remote controller operates by receiving power from said solar battery when said inverter is running, and transmits, to said control circuit, details of manipulation of said remote controller when said inverter stops, said details of manipulation being transmitted when said inverter is started.

6. The power conditioner for a solar power generation system according to claim 4, wherein said remote controller operates by receiving power from said utility power supply to manage the time during which said inverter stops.

* * * * *